March 21, 1967 K. T. BUTTERY 3,309,834
DISPENSING CARTON SUITABLE FOR PLASTIC BAGS AND THE LIKE
Original Filed Oct. 4, 1963 5 Sheets-Sheet 1
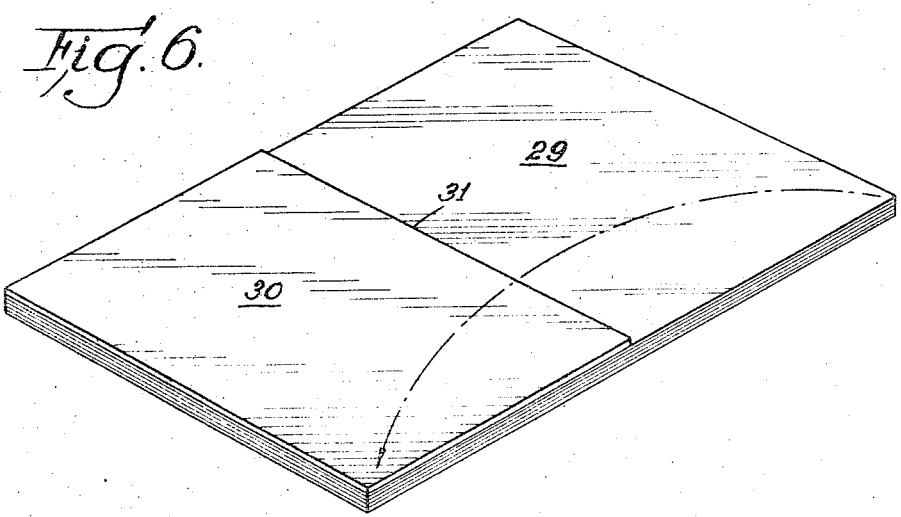
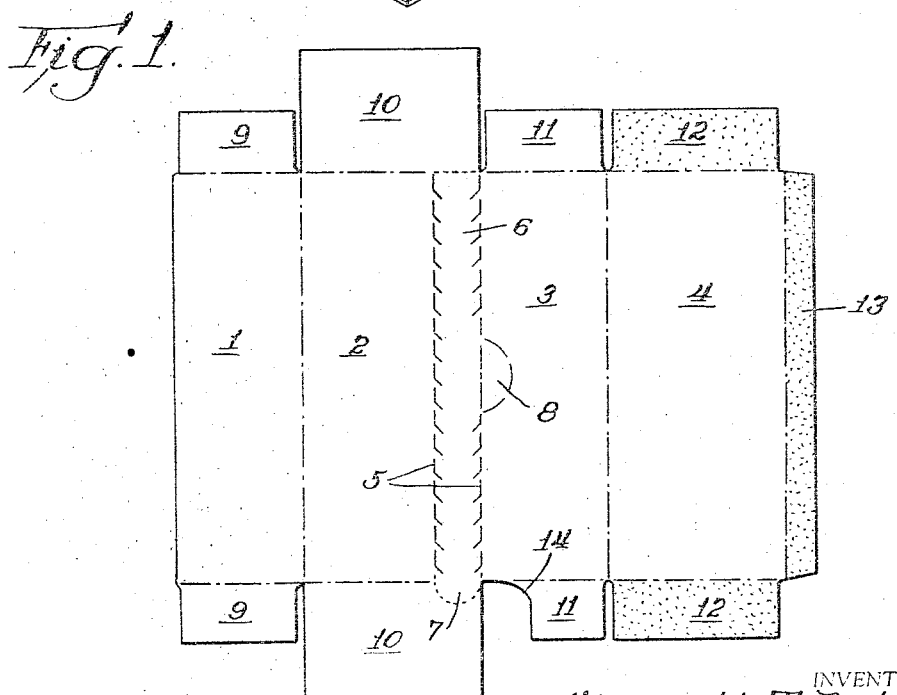
INVENTOR.
Kenneth T. Buttery
BY March 21, 1967 K. T. BUTTERY 3,309,834
DISPENSING CARTON SUITABLE FOR PLASTIC BAGS AND THE LIKE
Original Filed Oct. 4, 1963 5 Sheets-Sheet 2
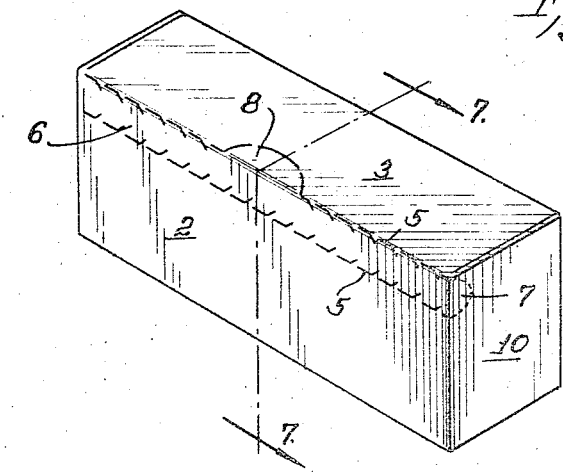
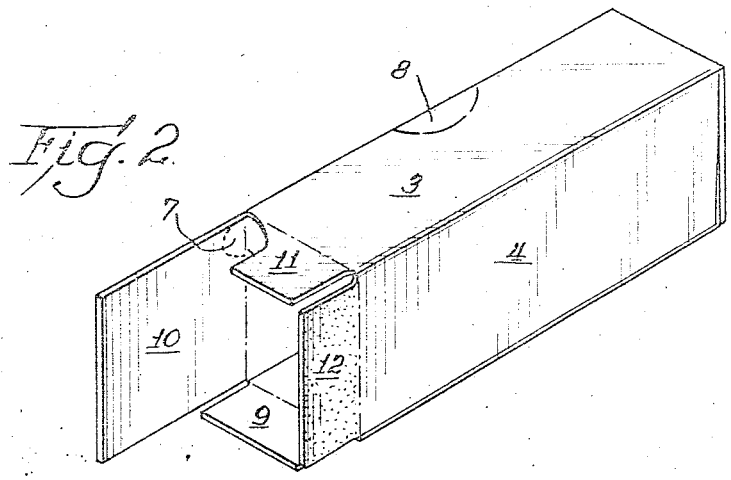
INVENTOR.
Kenneth T. Buttery

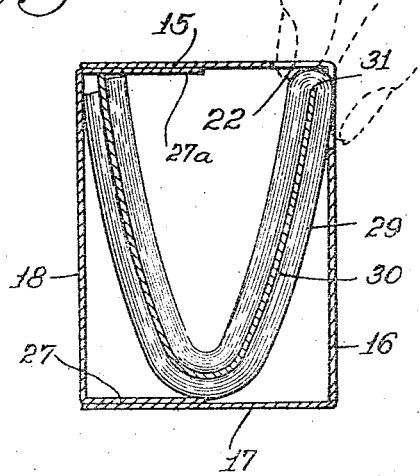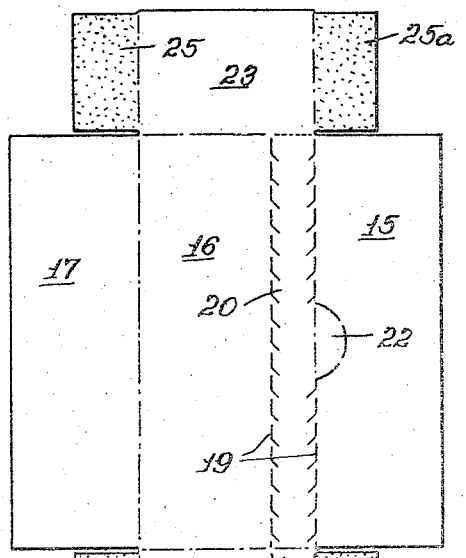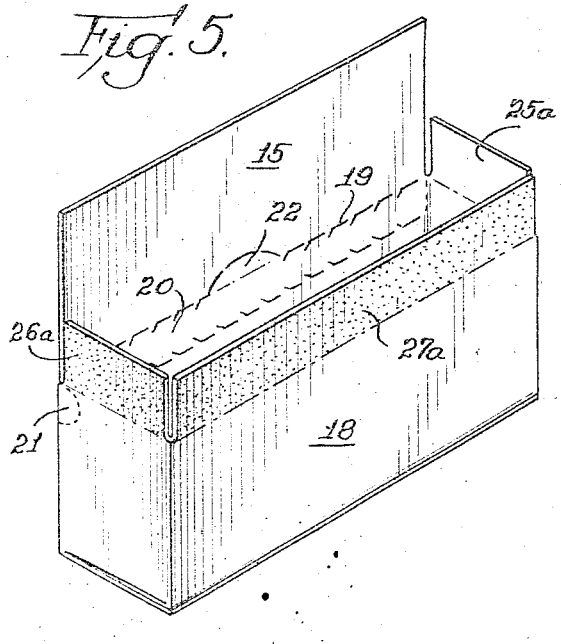

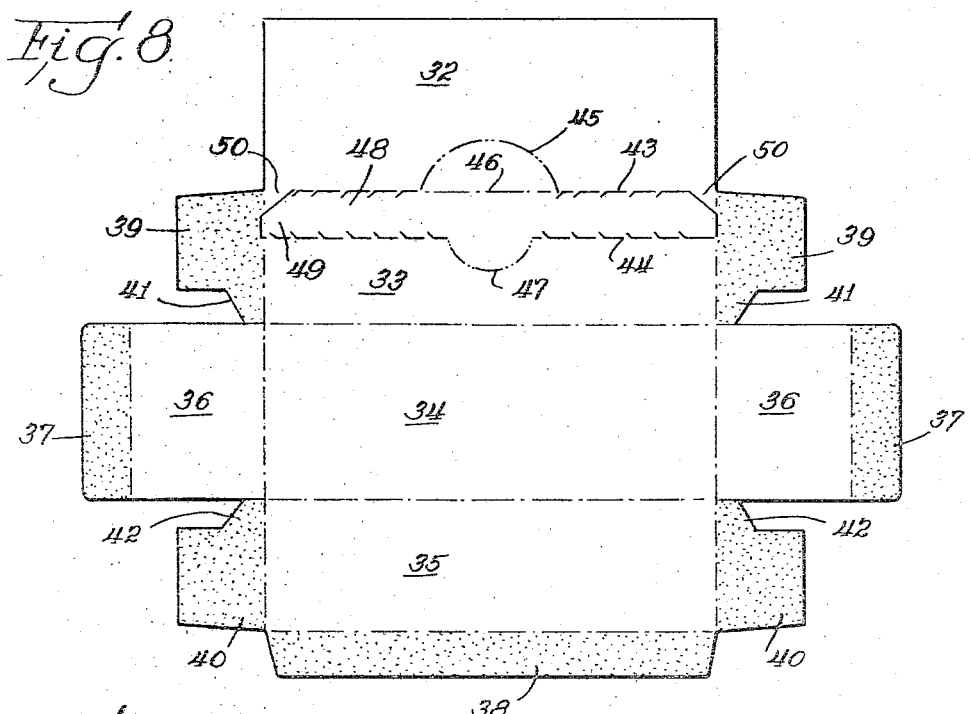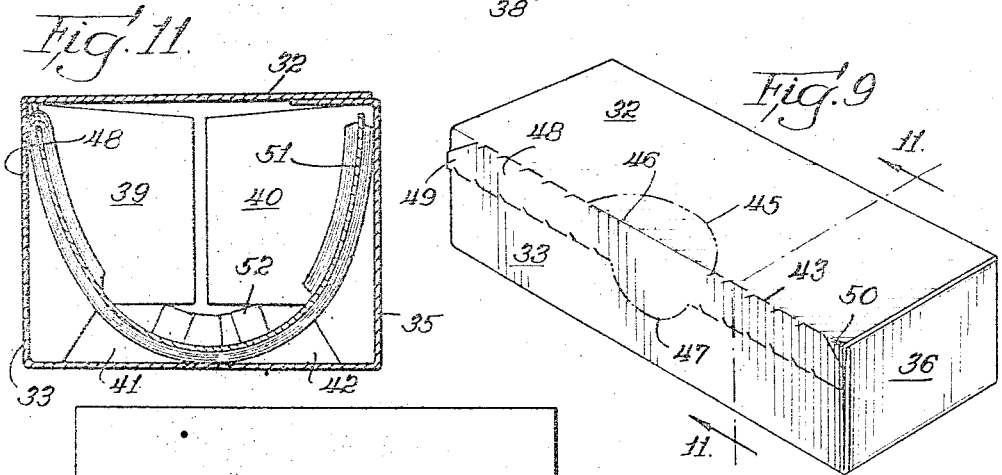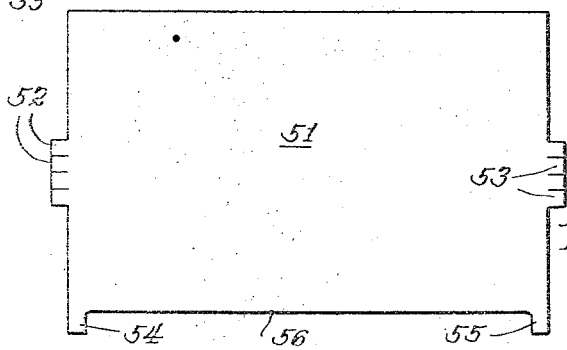

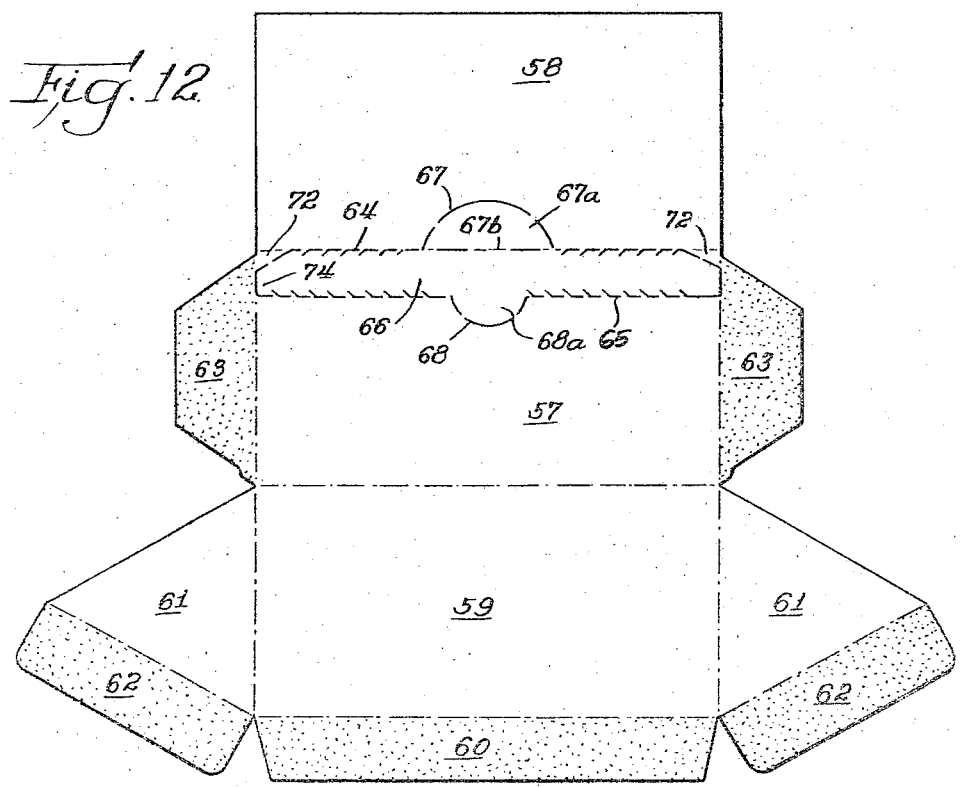
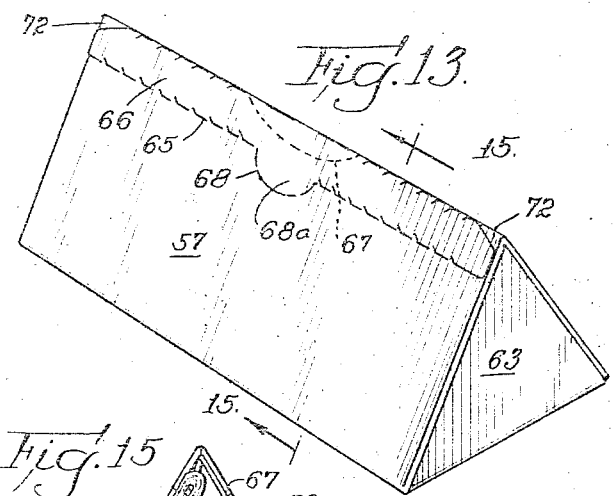
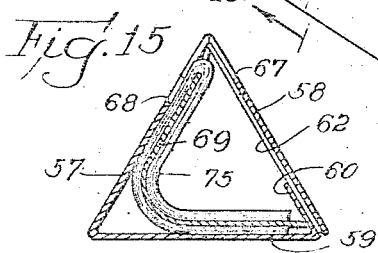
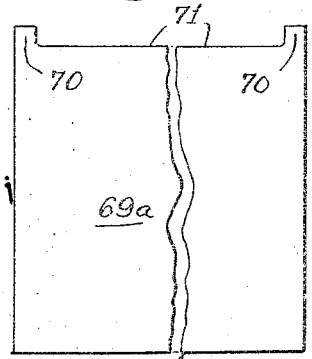

United States Patent Office 3,309,834
Patented Mar. 21, 1967

3,309,834
DISPENSING CARTON SUITABLE FOR
PLASTIC BAGS AND THE LIKE
Kenneth T. Buttery, Kalamazoo, Mich., assignor, by
mesne assignments, to Brown Company, a corporation
of Delaware
Original application Oct. 4, 1963, Ser. No. 314,025, now
Patent No. 3,195,772, dated July 20, 1965. Divided
and this application Mar. 12, 1965, Ser. No. 439,292
5 Claims. (Cl. 53—21)

This application is a division of my co-pending application Ser. No. 314,025 now Patent No. 3,195,772 issued July 20, 1965.

The present invention relates to dispensing cartons, and is more particularly concerned with cartons for dispensing discrete sheets or items of thin sheet material, especially of plastic, such as plastic sheets, lunch bags, sandwich bags, and the like.

Plastic film or sheet material such as polyethylene film is currently enjoying wide popularity for many applications. The popularity of these sheets or films is well deserved since the material even in thin film form is strong, highly transparent, and relatively inexpensive. Moreover, the material is sanitary and lends itself well to use in food packaging. Consequently, one of the most important uses of plastic film is in the production of food wrappers such as sandwich bags, lunch bags, and the like. However, because of the extreme thinness of the material, and frequently also its relatively slippery nature, discrete sheets, either alone or in the form of bags, are somewhat difficult to package and even more difficult to dispense from economical containers.

It is an object of the present invention to provide a dispensing carton which is particularly well adapted for packaging and dispensing discrete sheets of plastic material such as plastic bags. It is a further object to provide such a carton which may be readily filled by means of automatic machinery. It is a further object to provide such a carton having means provided for being readily opened. It is still a further object to provide a dispensing carton which retains plastic film sheets or bags in ready position for dispensing, and wherein individual bags may be readily withdrawn from the carton. It is an additional object to provide a carton of the type described which may be readily and economically constructed from an integral cut and scored blank. The accomplishment of the foregoing and additional objects will become more fully apparent hereinafter.

The invention in several preferred embodiments is illustrated by the accompanying drawings in which:

FIG. 1 is a plan view of a blank cut and scored to provide a dispensing carton according to one embodiment of the invention.

FIG. 2 is a perspective view of the carton partially erected and ready to be end filled or loaded.

FIG. 3 is a perspective view of the carton after it has been loaded and sealed.

FIG. 4 is a plan view of a blank cut and scored to provide a dispensing carton according to another embodiment of the invention.

FIG. 5 is a perspective view of the carton of FIG. 4 in partially erected form, ready to be side filled or loaded.

FIG. 6 is a perspective view showing a pile of plastic bags with a cardboard diaphgram or insert member placed thereover, in preparation to loading.

FIG. 7 is a cross-sectional view taken at the line 7—7 of FIG. 3 showing the arrangement of a loaded carton in which the contents are ready to be dispensed.

FIG. 8 is a plan view of a blank cut and scored to provide a dispensing carton according to another embodiment of the invention.

FIG. 9 is a perspective view of a completely formed, filled, and sealed carton prepared from the blank of FIG. 8.

FIG. 10 is a plan view of an insert member or diaphragm.

FIG. 11 is a cross-sectional view showing one end of the formed, filled, and sealed carton of FIG. 9, as viewed from the inside of the carton.

FIG. 12 is a plan view of a blank cut and scored to provide a dispensing carton according to still another embodiment of the invention.

FIG. 13 is a perspective view of a completely formed, filled and sealed carton prepared from the blank of FIG. 12.

FIG. 14 is a plan view of an insert member; and

FIG. 15 is a cross-sectional view taken at the line 15—15 of FIG. 13.

According to the invention, a carton is provided which may be loaded after it has been partly erected. Sheet-form members such as plastic sheets or bags which are to be dispensed from the carton are folded around the edge of an insert member of cardboard or any other suitable sheet material which exhibits some resilience. The dimensions of the insert members are so designed that the member must be bowed into arcuate form in order to fit into the carton. In preparation for loading, the desired content of sheet material, such as a number of plastic bags, is folded around one edge of the insert member. The assembly is bowed and inserted into the carton in such a manner that the edge of the insert member around which the plastic material is folded is presented at the corner of the carton at which a tear strip or other slot forming means is provided. The resilience of the bowed diaphragm maintains the folded edge in position at the slot where the fold of a plastic sheet, e.g., bag, may be easily grasped for removal of the contents from the carton. Individual sheets, e.g., bags, may thus be readily extracted without disturbing the remainder.

Reference is now made to the accompanying drawings for a better understanding of the invention, wherein all of the parts are numbered and wherein the same numbers are used to refer to corresponding parts throughout.

One embodiment of the present invention, referred to as an "end-fill" carton, is illustrated in FIGS. 1–3. The carton is formed from an integral blank as shown in FIG. 1, and comprises a bottom 1, a front wall 2, a top 3, and a rear wall 4. The front wall 2 is provided with spaced apart substantially parallel fracture scores 5 defining a tear strip 6 having a grip tab 7. The fracture score at the junction of the top 3 and front wall 2 is discontinuous at the center and the two parts thereof are connected by a semi-circular score line forming a recess tab 8. The carton is provided with bottom end flaps 9, outer end wall flaps 10 hingedly connected to the front wall 2, top end flaps 11, and rear wall end flaps 12. As alternative arrangements, any of the flaps 9, 11 or 12 may be enlarged to serve as outer end flaps in place of the outer end flap 10. A glue flap 13 is hingedly connected to one edge of the rear wall 4.

A flap recess 14 is provided in the top end flap 11, adjacent to the tab 7 so that the tab will be cleared when the carton is erected.

In erecting the carton, the glue flap 13 is first glued to the bottom edge of the bottom 1 to form a tubular structure. This step is generally carried out by the manufacturer, and the carton is then shipped in flat condition to the customer for erection and filling. In preparing the carton for filling, one end is erected by folding in the flaps 9, 11 and 12, and then gluing the outer end flap 10 thereover, resulting in the structure shown in FIG. 2. The carton is then filled through the open end with the desired contents, and the open end closed in the same manner. The result is a strong sealed carton, as shown in FIG. 3. The carton is prepared for dispensing its contents by gripping the tab 7 and removing the tear strip 6 together with the recess tab 8. As a result, an open slot is formed with a connecting finger port at the edge of the top, formed by the removal of the tab 8, permitting a finger to be inserted to grasp the fold of a plastic sheet or bag within the carton.

FIGS. 4 and 5 illustrate an alternative embodiment of the present invention which may be termed a "side-load" carton. This carton may also be formed from an integral cut and scored blank, as shown in FIG. 4, and comprises a top 15, a front wall 16, a bottom 17, and a rear wall 18. The front wall 16 is provided with fracture scores 19 forming a tear strip 20 having a grip tab 21. A recess tab 22 is provided in the top 15 by slitting and scoring. An outer end wall 23 is hingedly connected to the front wall 16 and another outer end wall 24 is hingedly connected at the other end of the front wall 16 and to one end of the rear wall 18. The outer end wall 23 is provided with glue flaps 25, the outer end wall 24 is provided with a pair of glue flaps 26, and the rear wall 18 is provided with glue flaps 27 and 28.

In assembling the side-loading carton, the glue flap 28 is secured to the outer end flap 23. The glue flaps 25, 26 and 27 are then folded in and the bottom 17 folded thereover and secured thereto to form the structure shown in FIG. 5. The carton may then be loaded through the open top side. The glue flaps 25a, 26a, and 27a are then folded over and the top closed and secured thereto. The carton may be prepared for dispensing by removing the tear strip as described above with respect to the first embodiment.

The present invention resides primarily in a novel structure and method for loading the cartons described with sheets or bags made of a thin plastic film and maintaining them in such manner that they may be dispensed readily upon opening of the carton. The steps involved in the method of loading and the novel structure are illustrated in FIGS. 6 and 7. In FIG. 6 is shown a pile of plastic film bags 29. Placed thereover and occupying substantially one-half of the area of the bags is a cardboard insert member 30. In preparing the assembly for loading, the exposed portion of the paper bags is folded over an edge 31 of the insert member in the direction shown by the arrow, and positioned so that the two ends of the plastic bag pile and one end of the insert member are substantially aligned. The insert member and the bags are then bowed until the assembly attains an arcuate cross-section and is then so arranged with respect to the carton that the edge 31 of the insert member 30 about which the plastic bags are folded is presented at the corner of the carton adjacent to the tear strip. This arrangement is shown in detail in FIG. 7. When the tear strip and recess tab are removed, an exit slot is formed having a connecting finger port located at the center thereof. The fold is thus exposed and the outermost bag may be readily grasped and extracted with the fingers. Manual engagement of the folds of the bags is further facilitated by the fact that at the concave side of the arcuate assembly the plastic bags or sheet material are loosened slightly as a result of the arcuate bowing of the pile. Each bag slides freely and all the bags may be successively withdrawn.

The length of the insert member should preferably be substantially the same as the width of the bags which it is to support, although considerable variation is permissible. The width of the insert member should be about one-half (½) the length of the plastic bags and substantially greater than the width of one side of the carton. For many applications, and particularly when cartons having a rectangular cross-section are used, the insert members may advantageously have a width greater than the width of two sides of the carton, as shown in FIG. 7, so that the insert member is retained in arcuate form by the carton walls. When the width of the insert member is of the proper size, the arcuate configuration which the insert member is forced to assume in order to allow entry into the carton causes the fold of supported material at the edge thereof to be properly presented at the exit slot formed upon removal of the tear strip of the carton, and to provide sufficient resilience to maintain the fold in proper orientation until all of the bags have been dispensed from the carton.

As can be readily seen, the insert member may be inserted in arcuate position with its leading edge disposed at the tear strip in one of two positions. In the first position the end portion of the insert member approaches a position parallel to the panel containing the tear strip and perpendicular to the panel containing the finger port means. This arrangement is shown in FIG. 7 and is the preferred arrangement. In the alternative arrangement, the end portion of the insert member approaches a position perpendicular to the panel containing the tear strip and parallel to the panel containing the finger port means.

FIGS. 8–11 illustrate still another embodiment of the invention. In this embodiment the carton, the cut and scored blank for which is illustrated in FIG. 8, comprises a top panel member 32, a front panel member 33 hingedly connected thereto, a bottom panel member 34 hingedly connected to the front panel member, and a rear panel member 35 hingedly connected to an edge of the bottom panel member 34. Outer end panel members are hingedly connected to the ends of the bottom panel member 34. Glue flaps 37 are hingedly connected to the ends of the outer end panel members. A glue flap 38 is also hingedly connected to the edge of the rear panel member 35. Complementary inner end members 39 and 40 are hingedly connected at the ends of the front panel member 33 and rear panel member 35 respectively. Portions of the inner end members 39 and 40 are cut away to form detent slots 41 and 42.

A pair of spaced apart substantially parallel fracture scores 43 and 44 are provided at the edge of the front panel member adjacent to the top panel member. The upper fracture score 43 makes a curved excursion 45 into the top panel member 32 near the center of the panel. A hinge score 46 short-circuits the excursion to permit the top panel member 32 to hinge with the front panel member 33. The lower fracture score 44 makes a curved excursion 47 into the front panel member. The two fracture scores 43 and 44 cooperate to form a tear strip 48 having a tab 49 at one end.

The carton is opened by engaging the tab 49 and detaching the tear strip 48 and connected tabs formed by the excursions 45 and 47. As a result, an exit slot is formed defined by the fracture scores 43 and 44. Additionally, the finger ports are formed as defined by the excursions 45 and 47. The upper fracture score 43 declines at its end. As a result, when the tear strip is removed, detents 50 remain.

In preparation for filing, the carton is partially assembled by gluing the inner end flaps 39 and 40 to the outer end flaps 36. The carton is then filled at the top, and the cover 32 glued down over the glue flaps 37 and 38 to form a sealed carton.

As shown in FIG. 9, a novel insert member is utilized for supporting the plastic film sheet members, and is comprised of a body member 51, a plurality of parallel end tabs 52 and 53, and a pair of spacers 54 and 55 which are positioned a sufficient distance apart to receive the sheet members to be packaged therebetween.

The carton is loaded in much the same manner as illustrated for the embodiments previously described. The insert member is placed over one end of a pile of plastic film sheet material, e.g., bags, the edge 56 connecting the two spacers 54 and 55 being oriented substantially at the mid-line of the sheet material. The remaining portion of the sheet material is then folded over the edge 56 between the spacers 54 and 55 and into engagement with the top surface of the insert member 51.

The insert member and sheet material supported thereon are then bowed downward and inserted into the carton. The length of the insert member, exclusive of the tabs 52 and 53, is so designed that it traverses the entire length of the interior of the carton. As a result, when the diaphragm is inserted into the box, the ends of the carton force the tabs 52 and 53 to be bent back substantially perpendicular to the body portion 51. However, when the insert member has been completely inserted, the tabs 52 and 53 enter and expand into the detent slots 41 and 42, securing the insert member in place. The spacers 54 and 55 engage the detents 50. The top panel member is then glued in place over the glue flaps 37 and 38.

The carton is prepared for dispensing by engaging the tab 49 and removing the tear strip 48. This provides an exit slot having a pair of finger ports at the center. After the tear strip has been removed, the detents 50 continue to engage the spacers 54 and 55 and maintain the edge 56 of the insert member in place. The spacers 54 and 55 also provide sufficient space so that the plastic film sheet material may be removed by engaging a fold thereof and withdrawing an individual sheet material through the exit slot. Individual sheets may be successively withdrawn until the entire contents of the carton have been exhausted. The resiliency of the insert member maintains the folded edge of the sheet material in proper presentation in front of the exit slot until all of the sheet material has been removed.

FIGS. 12–15 illustrate a carton according to to the invention having a triangular cross-section. A blank suitably cut and scored is illustrated in FIG. 12 and comprises a front panel member 57, a rear panel member 58, and a bottom panel member 59. A glue flap 60 is hingedly connected to one edge of the bottom panel member 59, and is adapted to be affixed to the free edge of the rear panel member 58. Outer end wall members 61 are hingedly connected to the ends of the bottom panel member 59 and glue flaps 62 are hingedly connected to edges of the outer end wall members 61. Glue flaps 63 are hingedly connected to the ends of the front panel member 57.

A pair of spaced-apart substantially parallel fracture scores 64 and 65 are provided in the front panel member at the upper edge thereof to form a tear strip 66. The fracture score 64 makes a curved excursion 67 into the rear panel member 58, and the fracture score 65 makes a curved excursion 68 toward the center of the front panel member 57 to provide enlarged finger ports 67a and 68a when the tear strip 66 is removed. A score line 67b by-passes the excursion 67 and permits the rear panel member 58 to hinge at the edge of the front panel member 57. The glue flaps are provided with an adhesive in the usual manner, as shown by the shaded areas.

The insert member 69 illustrated in FIG. 14 is comprised of a body portion 69a and a pair of spacers 70, one at each end of a leading edge 71.

The carton is assembled and loaded by first gluing the glue flaps 63 to the outer end members 61. The insert member and plastic bags 75 are then inserted in arcuate form, as by a plunger, so that the leading edge 71 presents the folds of the bags at the tear strip 66, and the spacers 70 are engaged by the detents 72. The glue flaps 62 are then folded in, the glue flap 60 folded thereover, and the rear panel member 58 folded over and affixed to all three glue flaps.

The tear strip 66 may be removed by gripping the tab 74 and removing the entire tear strip together with the area defined by the excursions 67 and 68. An exit slot is thus provided having an enlarged finger port at its center. The individual folds of the plastic bags may be conveniently grasped and the bags extracted.

The present invention solves the problem involved in loading and packaging thin sheet-form material, including plastic sheets, plastic film bags, and the like, caused by their extreme thinness, light weight, limpness, and slippery nature. It enables these materials to be readily loaded into cartons of convenient size without the need for expensive or complicated machinery. The cartons may be readily opened for dispensing the contents. Moreover, the sheet-form material is always maintained in the proper presentation position at the exit slots for ready removal of individual sheets or bags.

Although, in the embodiments illustrated in the foregoing description and drawings, the tear strip and finger port means are provided on particularly described panels, it is obvious that they may alternatively be provided on other adjacent pairs of panels. It is also obvious that the carton may be placed in any one of numerous positions for dispensing the contents thereof, the terms "top," "bottom," etc., being used herein merely for convenience in describing the invention.

It is to be understood that the invention is not limited to the exact details of construction, operation, or exact materials or embodiments shown and described, as obvious modifications and equivalents will be apparent to one skilled in the art, and the invention is therefore to be limited only by the scope of the appended claims, in which the term "sheet-form articles" is to be understood as including not only sheets themselves but also articles, e.g., bags, formed from sheets.

I claim:

1. A method of filling a dispensing carton with a plurality of thin sheet-form articles, said carton having means for providing an exit slot, said method comprising folding said sheet-form articles around the leading edge and adjacent the sides of a sheet-form insert member, bowing said insert member and inserting said insert member and said sheet-form articles into said carton in arcuate form with the leading edge of said insert member supporting the folds of said sheet-form articles in position adjacent said exit slot providing means, and closing said carton.

2. A method of filling a dispensing carton with a plurality of thin sheet-form articles, said carton having means for providing an exit slot, said method comprising arranging said sheet-form articles in a pile, placing a sheet-form insert member over a portion of the area of said pile, folding the remaining portion of said pile around the leading edge and adjacent the sides of said insert member, bowing said insert member and inserting said insert member and said sheet-form articles into said carton in arcuate form with the leading edge of said insert member supporting the folds of said sheet-form articles in position adjacent said exit slot providing means, and closing said carton.

3. A method of filling a dispensing carton with a plurality of plastic film sheet-form articles, said carton having means for providing an exit slot and having means defining a detent socket at each interior end thereof, said method comprising folding said sheet-form articles around the leading edge and adjacent the sides of a sheet-form insert member, said insert member having a length substantially equal to the length of the interior of said carton and having detent tabs provided substantially at the middle of each side thereof, bowing the insert member and sheet-form articles and inserting them into said carton in arcuate form while bending over said detent tabs and causing them to enter and be engaged by said detent sockets to retain said insert member in a position wherein the folds of said sheet-form articles are positioned adjacent said exit slot providing means, and closing said carton.

4. A method of filling a dispensing carton with a plurality of plastic film sheet-form articles, said carton having means for providing an exit slot and having means defining a detent socket at each interior end thereof, said method comprising arranging said sheet-form articles in a pile, placing a sheet-form insert member over a portion of the area of said pile, said insert member having a length substantially equal to the length of the interior of said carton and having detent tabs provided substantially at the middle of each side thereof, folding the remaining portion of said pile around the leading edge and adjacent the side of said insert member, bowing the insert member and sheet-form articles and inserting them into said carton in arcuate form while bending over said detent tabs and causing them to enter and be engaged by said detent sockets to retain said insert member in a position wherein the folds of said sheet-form articles are positioned adjacent said exit slot providing means, and closing said carton.

5. A method of filling a dispensing carton with a plurality of plastic film sheet-form articles, said carton having means for providing an exit slot terminated by a pair of detents and having means defining a detent socket at each interior end thereof, said method comprising arranging said sheet-form articles in a pile, placing a sheet-form insert member over a portion of the area of said pile, said insert member having a length substantially equal to the length of the interior of said carton, and having detent tabs provided substantially at the middle of each side thereof and additionally having a pair of spacers at the ends of the leading edge thereof, folding the remaining portion of said pile around the leading edge of said insert member between said spacers and adjacent the sides of said insert member, bowing and inserting the insert member and sheet-form article assembly into said carton in arcuate form while bending said detent tabs and causing them to enter and be engaged by said detent sockets and causing said spacers to be engaged by said detents to retain said insert member in a position wherein the folds of said sheet-form articles are positioned adjacent said exit slot providing means, and closing said carton.

No references cited.

RICHARD H. EANES, JR., *Primary Examiner.*